United States Patent [19]

Vaske

[11] Patent Number: 5,684,541
[45] Date of Patent: *Nov. 4, 1997

[54] TRANSMITTER STATION FOR TRANSMITTING A PLURALITY OF TELEVISION PROGRAMS, AND RECEIVER FOR RECEIVING THE PROGRAMS

[75] Inventor: Bernardus H. M. Vaske, Eindhoven, Netherlands

[73] Assignee: U.S. Philips Corporation, New York, N.Y.

[*] Notice: The term of this patent shall not extend beyond the expiration date of Pat. No. 5,579,061.

[21] Appl. No.: 528,749

[22] Filed: Sep. 15, 1995

Related U.S. Application Data

[63] Continuation of Ser. No. 241,886, May 12, 1994.

[30] Foreign Application Priority Data

May 13, 1993 [BE] Belgium .................. 09300494

[51] Int. Cl.$^6$ .................. H04N 5/445; H04N 7/087
[52] U.S. Cl. .................. 348/461; 348/468; 348/434; 348/555
[58] Field of Search .................. 348/461, 467, 348/1, 731, 732, 432, 434, 435, 468, 465, 460, 478, 555, 557, 558; 455/2; H04M 5/445, 7/087, 7/08

[56] References Cited

U.S. PATENT DOCUMENTS

| | | | |
|---|---|---|---|
| 4,394,690 | 7/1983 | Kobayashi | 358/180 |
| 4,488,179 | 12/1984 | Kruger et al. | 348/476 |
| 4,701,794 | 10/1987 | Froling et al. | 348/476 |
| 4,891,703 | 1/1990 | Noudan | 348/460 |
| 4,908,707 | 3/1990 | Kinghorn | 348/468 |
| 4,977,455 | 12/1990 | Young | 358/142 |
| 5,038,211 | 8/1991 | Hallenbeck | 358/142 |
| 5,200,823 | 4/1993 | Yoneda et al. | 348/473 |
| 5,210,611 | 5/1993 | Yee et al. | 358/191.1 |
| 5,231,493 | 7/1993 | Apitz | 358/146 |
| 5,253,066 | 10/1993 | Vogel | 358/188 |
| 5,283,639 | 2/1994 | Esch et al. | 348/6 |
| 5,325,131 | 6/1994 | Penny | 348/556 |
| 5,579,061 | 11/1996 | Vaske | 348/731 |

FOREIGN PATENT DOCUMENTS

| | | | |
|---|---|---|---|
| 0263555 | 4/1988 | European Pat. Off. | H04N 5/445 |
| 0447968 | 9/1991 | European Pat. Off. | H04N 7/087 |

OTHER PUBLICATIONS

NTZ Nachrichtentechnische Zeitschrift, vol. 35, No. 6, Jun. 1982, Berlin DE pp. 368–276, H.E. Kruger "Das DIgitale Fernsehkennungssystem ZPS" (Cursory Review Only).

*Primary Examiner*—Glenton B. Burgess
*Attorney, Agent, or Firm*—Michael E. Marion

[57] ABSTRACT

Transmitter station for transmitting, and receiver for receiving a plurality of television programs via respective transmission channels. A teletext page with tuning data (F) which are representative of the transmission channels used by the transmitter station is transmitted by means of one of the programs, for example a local television program. Moreover, further signal processing data are incorporated in the teletext page, which data are representative of the transmitted television programs, such as a station name (NAM), a system code (S) and a predetermined teletext page number (PDC). When the television receiver is tuned to a television program, the respective signal processing circuits are controlled by means of the corresponding signal processing data.

2 Claims, 6 Drawing Sheets

| P | F(MHz) | NAM | S | PDC |
|---|---|---|---|---|
| 01 | 175.25 | NLD 1 | 0 | 210 |
| 02 | 511.25 | NLD 2 | 0 | 220 |
| 03 | 697.00 | NLD 3 | 0 | 230 |
| .. | | | | |
| 42 | 444.00 | ARD | 0 | |
| 43 | 48.25 | ZDF | 0 | |
| 44 | 501.25 | BBC 1 | 0 | 601 |
| .. | | | | |

TV STANDARD CODE

FIG.2A  `nnn-Cabletext April 26 10.47:00`

FIG.2B  `& L  NXT V % P  F  NAM S PDC c`

FIG.2C  `P F  NAM S PDC c P C P F  NAM S PDC c`

FIG. 3

| | | | |
|---|---|---|---|
| 0 | 1BE | 1BE | 1BE-Cabletext April 26 10.47:00 |
| 1 | & | &48 | 0&0117525NLD 1 0210 & |
| 2 | 0251125NLD 2 0220 &0369700NLD 3 0230 & |
| . | | | |
| 22 | 42440000ARD 0 &4304825DF 0 & |
| 23 | 450125BBC 1 0601 ! |

TRANSMITTER STATION FOR TRANSMITTING A PLURALITY OF TELEVISION PROGRAMS, AND RECEIVER FOR RECEIVING THE PROGRAMS

This is a continuation of application Ser. No. 08/241,886, filed May 12, 1994.

FIELD OF THE INVENTION

The invention relates to a transmitter station for transmitting a plurality of television programs via respective transmission channels, comprising a data generator adapted to transmit tuning data in the television signal of one of the television programs, which tuning data are representative of the transmission channels used by the transmitter station. The invention also relates to a television receiver for receiving television signals from such a transmitter station.

BACKGROUND OF THE INVENTION

A transmitter station of the type mentioned in the opening paragraph is described in European Patent Application EP 0 263 555. The transmitter station is notably applicable in cable television systems in which the cable network manager takes care of the distribution of television programs. As described in this Patent Application, the cable television transmitter station transmits, simultaneously with at least one of the television programs, a teletext page in which the tuning data of the available programs and corresponding preset numbers are stated. The tuning data represent the transmitter frequency or the channel number through which the plurality of television programs is transmitted.

In an automatic installation procedure which can be carried out by television receivers the tuning data are received and stored in a tuning memory of the receiver at memory locations which correspond to the preset numbers. After execution of such an installation procedure, the television receiver is programmed, i.e. a preset number has been allocated to each receivable television program. The receiver can now be tuned by means of preset keys. The installation procedure is a very user-friendly operation, on the one hand because it is carried out fully automatically, on the other hand because the preset numbers are allocated to the receivable television programs by the local cable network manager and will generally satisfy the user's wishes.

In practice, the tuning data are transmitted along with the television signal of a local television program generated by the cable network manager. Practically all cable networks transmit such a program in the form of a cable newspaper, a mosaic image or the like. As described in said Patent Application, the transmission may be effected via a teletext page intended for this purpose.

OBJECT AND SUMMARY OF THE INVENTION

It is an object of the invention to improve the installation procedure and provide further useful facilities for a user-friendly operation of television receivers.

To this end the television Transmission system according to the invention is characterized in that the data generator is adapted to transmit further signal processing data which are representative of the transmitted television programs. It is thereby achieved that these signal processing data can be stored automatically and simultaneously with the tuning data in the television receiver without the user being required to have any technical knowledge and without manual programming.

The signal processing data may be constituted, for example by character series which represent a displayable name of the respective television programs. This provides suitable receivers with the possibility of displaying a name coupled to a television program for a predetermined period of time when the receiver is tuned to this program. It also provides the possibility of displaying a survey of the names of the receivable television programs on the display screen of a receiver in response to a relevant operating signal. It is to be noted that television receivers are known per se in which the name of a station can be stored for each receivable television program. However, the station names are to be programmed by hand, which is an extremely cumbersome procedure. It is also known from the World System Teletext standard to incorporate a data packet in the teletext cycle comprising a displayable character series with, for example the station name. In this way, however, only television programs transmitting teletext in which the data packet with the station name is actually incorporated are provided with a station name. Moreover, the station name can only be displayed after some waiting time, viz. after the receiver has been tuned to the relevant television program and has received the relevant data packet. Moreover, the station name is determined by the relevant television station. If this is, for example a foreign station, the station name may deviate from a locally used, better indication.

The signal processing data may be further constituted by codes indicating the television standards at which the respective television programs are transmitted. The transmission of such a code is very attractive if the following aspects are considered. The hitherto conventional installation procedures comprise the search for a television program by means of an automatic search unit which finds a program as soon as a video signal has been recognized. However, the user may subsequently have to perform a manual operation in order to switch the receiver from PAL to NTSC so that the sound is also demodulated correctly. The setting chosen is subsequently stored in the tuning memory. The automatic search unit should also know in advance at which television standard a program to be searched is being transmitted. For example, television signals in accordance with a given SECAM standard are not found by an automatic search unit if this unit is adapted to search for PAL or NTSC signals. A multistandard receiver therefore runs through the entire available frequency range several times, with a different television standard being referred to during each run. If said code is transmitted by means of the local television program, these drawbacks are completely absent and a multistandard receiver can be installed much more rapidly.

The signal processing data may be further constituted by page numbers of predetermined teletext pages which are transmitted along with the respective television programs. A current example of such a teletext page is a PDC page (Program Delivery Control) with which a television receiver can be programmed so as to automatically display or record a given broadcast.

A further embodiment of the transmitter station is obtained if the data generator is further adapted to transmit a language code. With this code, television receivers provided with a menu operating system in various languages can be automatically switched over to the language used in the reception range of the transmitter station.

BRIEF DESCRIPTION OF THE FIGURES

FIGS. 2A, 2B and 2C shows some formats of teletext data packets which are generated by a teletext generator shown in FIG. 1.

FIG. 3 shows an embodiment of a teletext page with tuning data and signal processing data.

DETAILED DESCRIPTION OF PREFERRED EMBODIMENTS OF THE INVENTION

Figures 1, 6:
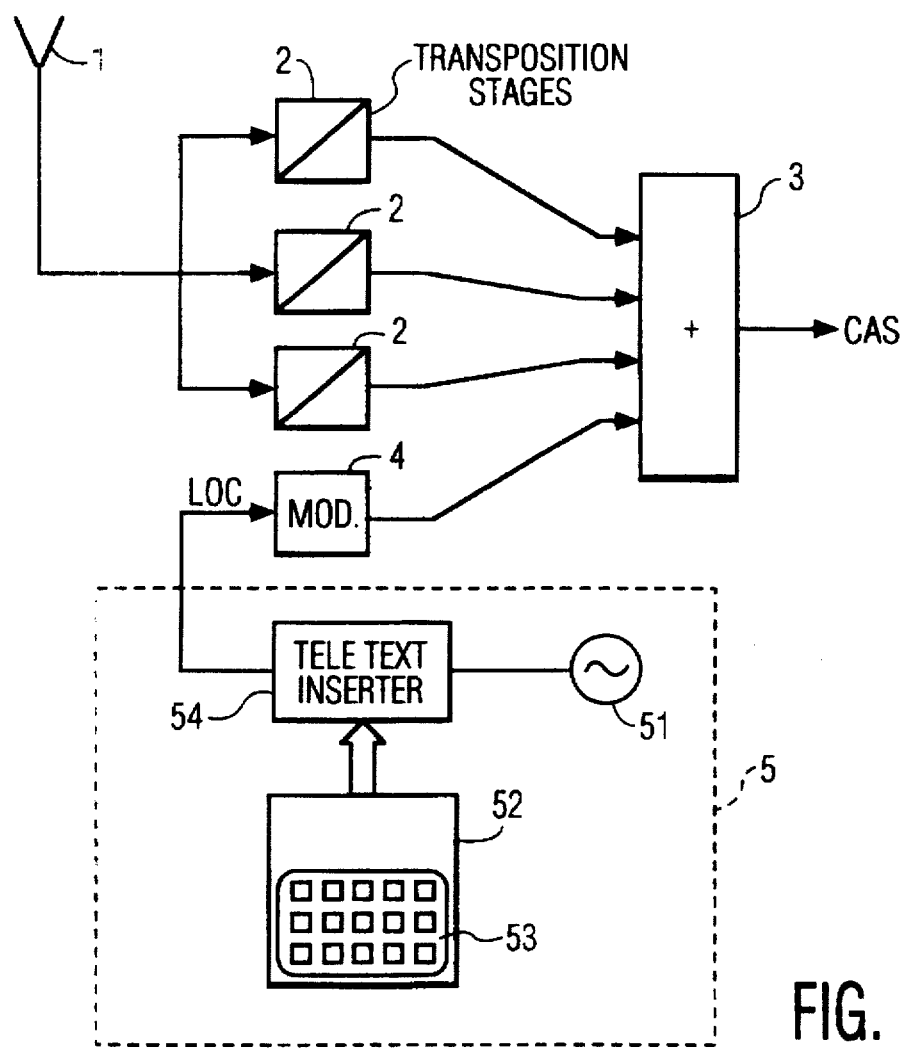
FIG. 1 shows a transmitter station for transmitting a plurality of television programs according to the invention.
FIG. 6 shows a possible division of a tuning memory which is shown in FIG. 4, after execution of the installation program shown in FIG. 5.

FIG. 1 shows a transmitter station according to the invention. The transmitter station has an antenna 1 for receiving television programs. These programs are retransmitted by means of a plurality of parallel-arranged transposition stages 2 via transmission channels which are determined by the station manager. The signals supplied by the transposition stages are added together in an adder circuit 3, so that a central antenna signal CAS occurs at the output thereof, which signal is transmitted to a plurality of television receivers. The retransmitted television programs may or may not comprise a teletext service.

In addition to the retransmitted television programs, the signal CAS also comprises a locally generated television program whose television signal LOC is applied to the adder circuit 3 via a modulator 4. This local TV program is supplied by a signal source 5. This source comprises a video signal source 51 which supplies a baseband video signal and a teletext generator 52 which supplies one or more teletext pages. The teletext generator comprises a keyboard 53 for composing the teletext pages. The pages to be transmitted are accommodated by a teletext inserter 54 on picture lines in the picture flyback of the video signal LOC. It will hereinafter be assumed that the teletext pages are transmitted in accordance with the World System Teletext standard. In this standard each picture line with teletext data corresponds to a row of 40 character positions on the display screen. It will be assumed that a cycle of 120 pages is transmitted via the local television program in two picture lines of the television signal. The duration of the cycle is 30 seconds. One of the pages constitutes the page with tuning data and signal processing data.

FIG. 2 shows a possible division of transmitted teletext rows. More particularly, FIG. 2A shows the page header of the teletext pages. Such a page header starts with eight character positions identifying the page. The remaining part comprises 24 character positions with a page header text and 8 character positions for display of the actual time. In principle, the header text of all pages is equal for all teletext pages. However, it is possible (and common practice) to incorporate the page number in the form of displayable characters in the header text once again. In that case the page headers differ from each other in the page number. As is shown by way of example in FIG. 2A, the page header of all teletext pages transmitted with the local television program comprises the character series "nnn~Cabletext. . . . ,". Herein, nnn represents the page number and ~ represents a code indicating that the television program comprises the page with tuning data. In this embodiment the code ~ is considered to be constituted by the "steady" control code which is provided by the teletext standard.

FIGS. 2B and 2C show the format of the text rows constituted by the page with tuning data. More particularly, FIG. 2B shows the format of the first text row and FIG. 2C shows the format of the other text rows. The first 20 characters of the first text row (see FIG. 2B) comprise system information, inter alia, two characters && so as to indicate that the page with tuning data is concerned, a language code L, the page number NXT of possible subsequent pages with further tuning data, a version number V and a character % to indicate that it is followed by further data for each television program. Non-specified character positions are reserved for future uses. The second part of the first text row (see FIG. 2B) and the first and second parts of the other text rows (see FIG. 2C) comprise the further data for each television program which is transmitted by the transmitter station. These data comprise tuning data, via. a 2-digit preset number P and a 5-digit tuning frequency F, and further signal processing data, via a transmitter name NAM of 7 characters, a system code S to indicate in accordance with which television standard the relevant program is being transmitted (0=PAL B/G, 1=SECAM L, 2=PAL M, 3=NTSC, etc.), and a page number PDC of a teletext page with which video recorders can be programmed (PDC stands for Program Delivery Control). The tuning data and signal processing data may hereinafter be jointly referred to as program data. The program data of a television program are ended with a continuation code c indicating, by way of the character %, that more tuning data follow or, by way of the character !, that the program data on the page are ended.

Since the page with tuning data comprises various characters having a special significance and is not intended for selection by the user, a number outside the conventional range of 100–899 has been chosen for the page number, for example the hexadecimal number 1BE. An example of the page with tuning data is shown in FIG. 3. As has been attempted to show in this Figure, the page comprises the tuning data of 44 receivable television programs. The right-hand part of text row 1 comprises the tuning data of a television program which is coupled to preset number 01. This program is transmitted at 175.25 MHz, is named NLD 1, is transmitted in accordance with the PAL B/G standard and comprises the PDC data on teletext page 210. A second television program, coupled to preset number 02, is transmitted at 511.25 MHz, is named NLD 2, is also transmitted in accordance with the PAL B/G standard and comprises the PDC data on teletext page 220.

Several variations of the teletext page shown in FIG. 3 are possible. For example, the preset numbers need not necessarily be incorporated in the page, because they can also be derived from the row number, if necessary. If incorporated in the page, the preset numbers need not necessarily be incorporated in their numerical sequence. The division shown in FIG. 3 has, however the advantage of the possibility of detecting inconsistencies due to transmission errors. If such a situation occurs, a waiting time can be observed for a new transmission of the page. Moreover, a channel number may be used instead of the tuning frequency.

Figure 4:
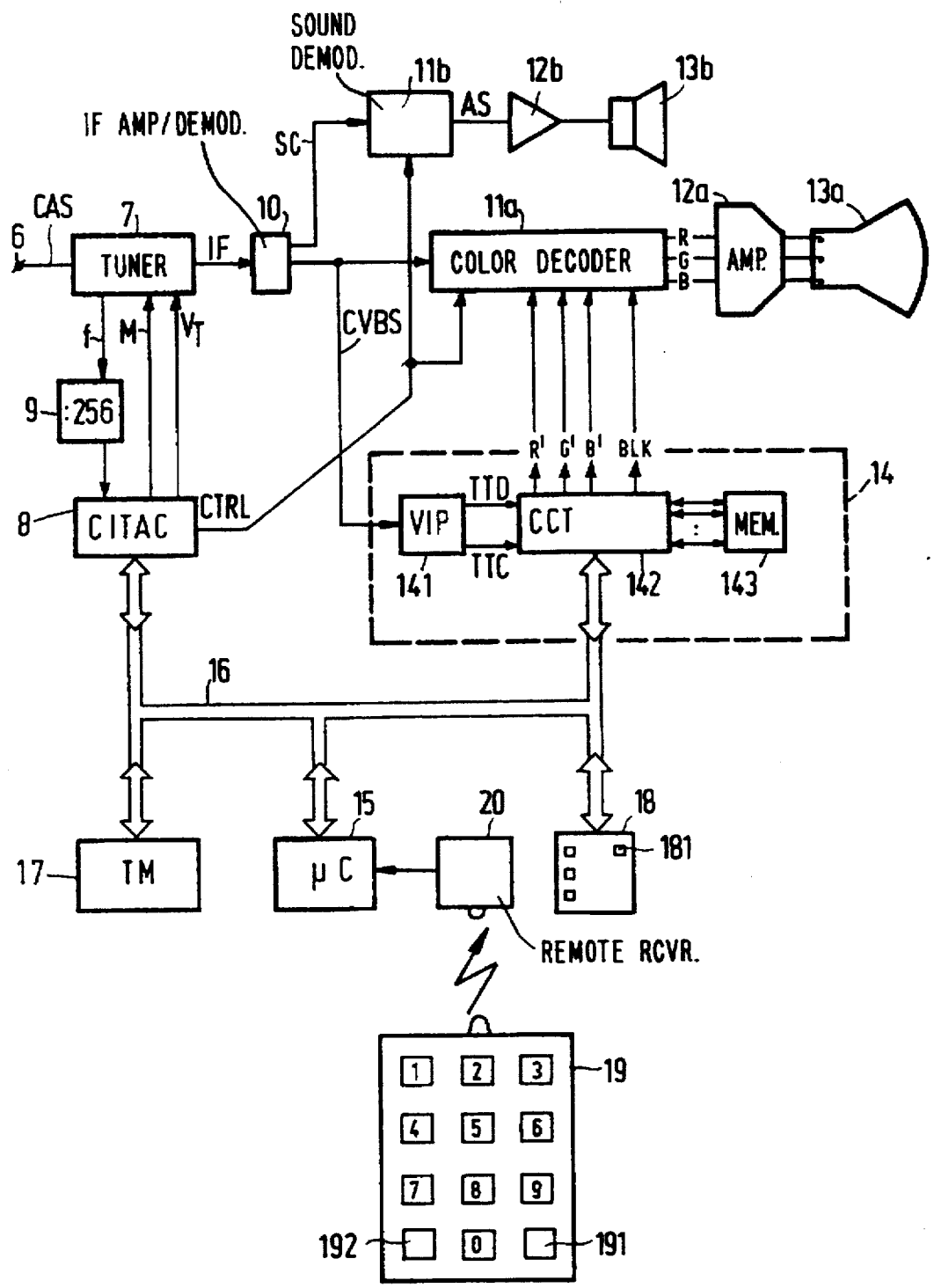
FIG. 4 shows diagrammatically the general structure of a television receiver according to the invention.

FIG. 4 shows diagrammatically the general structure of a colour television receiver (or the receiver section of a video recorder) in accordance with the invention. The receiver has an antenna input 6 which receives the central antenna signal CAS from the transmitter station shown in FIG. 1. The received signal is applied to a tuner 7. This tuner receives a tuning voltage $V_T$ from an interface circuit 8. The Philips IC SAB 3035 known under the name of CITAC (Computer Interface for Tuning and Analog Control) may be chosen as an interface circuit. The tuner 7 supplies an oscillator signal of the frequency f and, after division by 256 in a frequency divider 9, it supplies this signal to the CITAC 8. Thus, the tuner 7, divider 9 and CITAC 8 constitute a frequency synthesis circuit. If a number representative of a tuning frequency or channel number is applied to the CITAC, the tuner autonomously tunes to this frequency or channel number. The tuner also receives a signal M indicating whether a positive or negative modulated television signal is to be taken into account. The tuner 7 supplies an intermediate-frequency signal IF. The last-mentioned signal is applied to an intermediate-frequency amplifier and demodulation circuit 10 which supplies a baseband video signal CVBS and a sound carrier SC. The Philips IC TDA 2540 may be chosen for this circuit 10.

The video signal CVBS is applied to a colour decoding circuit 11a which supplies the three primary colour signals R, G, B which in their turn are applied via an amplifier circuit 12a to a display screen 13a for display of the received program. In the colour decoding circuit 11a, colour saturation, contrast and brightness are influenced by means of appropriate control signals CTRL which are also supplied by the CITAC. Moreover, it receives an additional set of elementary colour signals R', G' and B' and a blanking signal BLK by which the primary colour signals R, G and B can be suppressed completely or partly. A Philips IC of the TDA 356X family may be chosen for this circuit 11a.

The sound carrier SC is applied to sound demodulator 11b. It also receives the control signals CTRL, inter alia a signal to distinguish different sound carrier frequencies used at different television standards and signals for controlling sound volume and the like. The demodulator 11b supplies an audio signal AS which is applied to a sound reproducing device 13b via an amplifier 12b.

The video signal CVBS is also applied to a teletext decoder 14. This decoder comprises a video input processor 141 which receives the video signal CVBS, separates the teletext data packets therefrom and applies these packets through a data line TTD to a circuit 142 which will be referred to as Computer Controlled Teletext decoder (abbreviated CCT decoder). The CCT decoder also receives a clock signal from the video input processor 141 via a clock line TTC. It is further coupled to a memory 143 in which one or more teletext pages can be stored and which is therefore referred to as page memory. The CCT decoder supplies the three previously mentioned elementary colour signals R', G' and B' and the blanking signal BLK. The CCT decoder is also suitable for displaying locally generated On-Screen-Display information. The video input processor 141 may be constituted by the Philips IC SAA 5230, the CCT decoder 142 may be the Philips IC SAA 5240 and the page memory 143 may be an 8 kbyte RAM. For an extensive description of structure and operation of the teletext decoder 14, reference is made to "Computer Controlled Teletext", Electronic Components and Applications, vol. 6, no. 1, 1984, pp. 15–29.

The receiver further comprises a control circuit 15 in the form of a microcomputer. A microcomputer of the MAB 84xx family of Philips may be used for this purpose. The microcomputer is coupled via a bus system 16 to the teletext decoder 14, the CITAC 8, a non-volatile memory 17 and a local operating panel 18. The non-volatile memory 17, which will further be referred to as tuning memory TM, is used for storing, inter alia the timing clam of receivable television programs. The user can program the tuning memory at will by means of the local operating panel 18, i.e. he can arbitrarily store the tuning dam of desired television programs under a preset number. He may also allocate a station name to receivable stations. This further known method of programming the tuning memory will be referred to as "manual programming". The local operating panel further comprises an installation key 181 for automatic programming.

A hand-held remote control unit 19 is used for the daily operation of the receiver. This unit transmits infrared operating signals to a receiver 20 which is connected to an input of microcomputer 15. The remote control unit 19 comprises a plurality of keys 0 to 9, an OSD key 191 and a PDC key 192. The unit further comprises the customary keys (not shown) for controlling picture and sound, switching on a teletext mode and the like.

Figure 5:
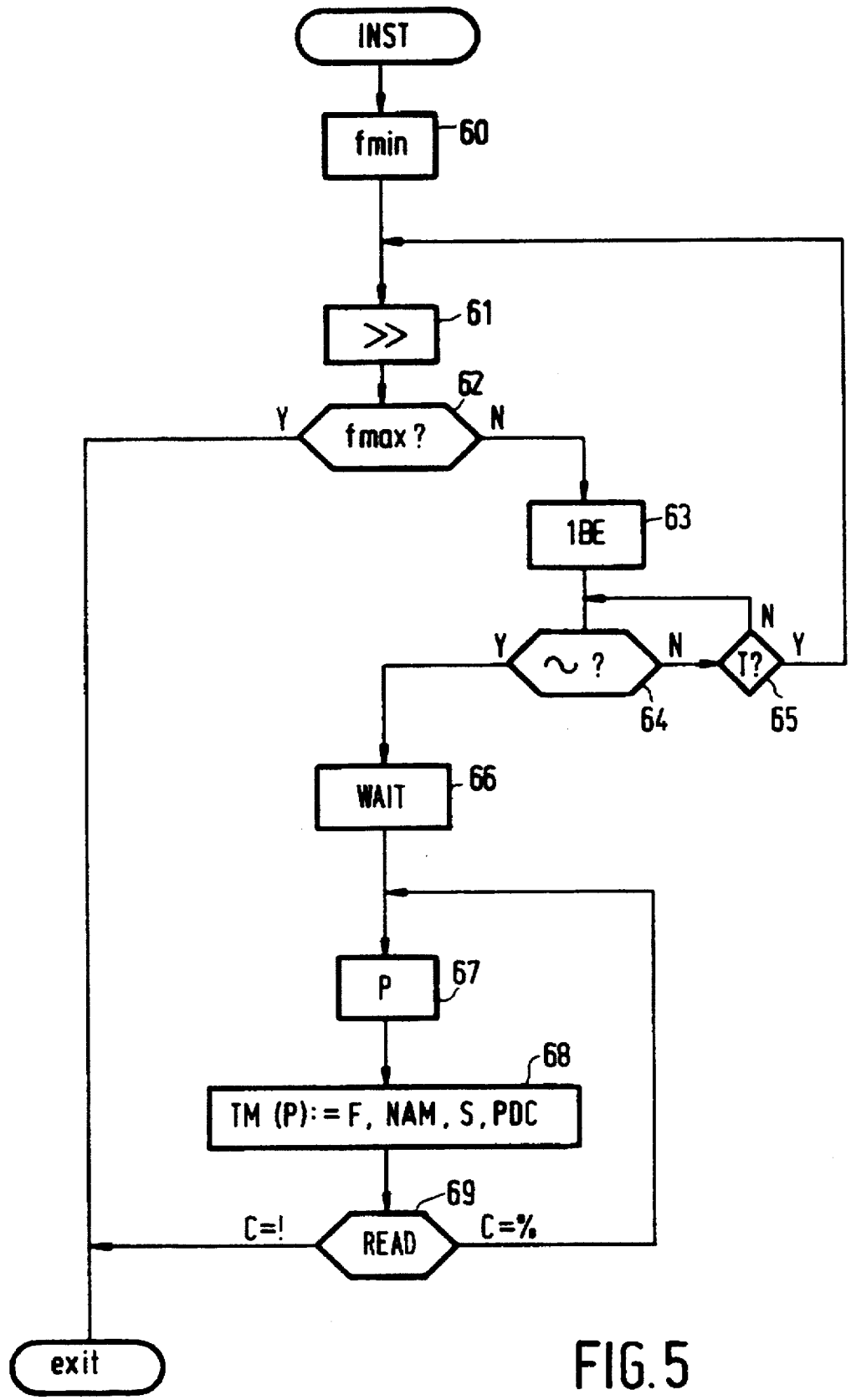
FIG. 5 shows the flow chart of an installation program which is performed by a microcomputer shown in FIG. 4.

The operation of the television receiver is further determined by a control program which is stored in the memory of microcomputer 15. If the installation key 181 is depressed, the microcomputer performs an installation program INST which is shown in FIG. 5. In a step 60 of this program a lowest tuning frequency $f_{min}$ is applied to the CITAC. Subsequently, in a step 61, a search procedure is started in which the tuning frequency is step-wise increased until a television signal is received. When a maximum frequency $f_{max}$ is exceeded (step 62), the installation program is ended.

While the receiver is tuned to a television program found, the microcomputer supplies the page number 1BE to the teletext decoder in a step 63. The teletext decoder now starts the acquisition of this page. While a waiting time of the selected teletext page is observed, the teletext decoder writes the page headers of all received pages into the page memory 143 (see FIG. 4) in further known manner. If the receiver is tuned to the local television program (two picture lines with teletex), this is effected by means of a frequency of 4 headers per second. The header text "nnn~Cabletext . . ." (see FIG. 2A) is thus written into the memory 4 times per second. Only the page numbers then change all the time. The rest of the header text is continuously overwritten by means of identical characters and is thus unchanged. Notably the "steady" code ~ is thus received 4 times per second from the start of the acquisition and written into the page memory.

In a step 64, the microcomputer reads the header text in the page memory and ascertains whether the "steady" code ~ occurs therein. If this is not the case, the microcomputer rereads the header text during a predetermined time T (step 65) of, for example, ½ second. If the receiver is tuned to a television program transmitting teletext, it is known after ½ second whether this is the local television program showing the page with tuning data. If this is not the case, the installation program returns to step 61 so as to search a further television program. This program loop is terminated as soon as in step 62 it has been ascertained that the highest tuning frequency $f_{max}$ is reached without the searched television program having been found. In that case, for example, the user can be informed that he should resort to "manual programming".

If the "steady" code ~has been found in step 64, the teletext decoder waits in a step 66 for the reception of teletext page 1BE with the program data. The entire page is now stored in the page memory. The microcomputer subsequently reads a preset number P (step 67) in the page memory and addresses a corresponding location TM(P) of the tuning memory. In a step 68 the microcomputer subsequently reads the P-associated tuning frequency F, the transmitter name NAM, the system code S and the page number PDC and stores them at said memory location TM(P). Finally, the continuation code c is read in a step 69.

If this code is constituted by the character %, the microcomputer will return to step 67 for processing a subsequent preset number. If the continuation code is constituted by the character !, all preset numbers will have been processed and the installation program will be ended. If not all preset numbers in page 1BE are transmitted, the microcomputer can read the page number NXT (see FIG. 2B) of a subsequent page in the first page header. This page is then selected (not shown in FIG. 5), whereafter the steps 67–69 for this subsequent page are repeated.

After termination of the installation procedure, the tuning memory has a content as is shown in FIG. 6. The memory comprises a plurality of memory locations each of which stores a tuning frequency F, transmitter name NAM, system code S and PDC page number. It is useful to present an On-Screen-Display survey of at least the preset numbers and the associated transmitter names on the display screen at the end of the installation procedure.

Figure 7:
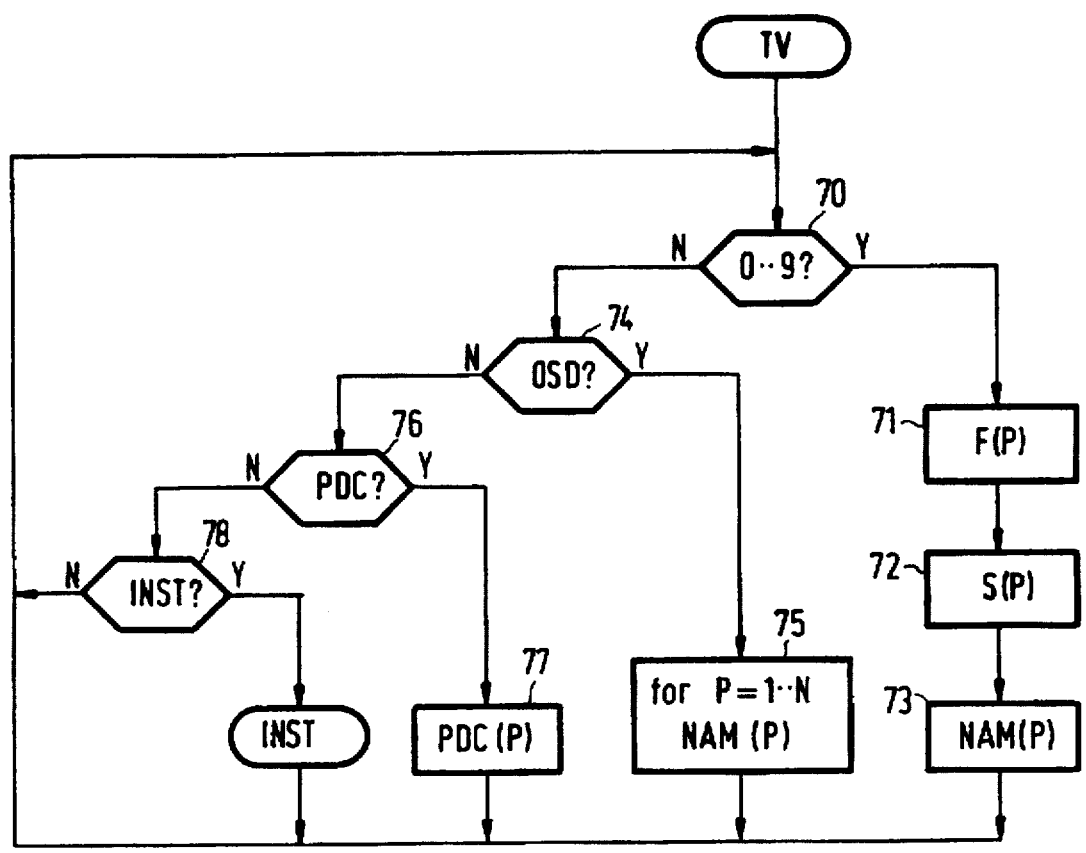
FIG. 7 shows the flow chart of a TV operating mode program performed by the microcomputer shown in FIG. 4.

Subsequently, the microcomputer assumes a TV operating mode. The control program executed in this mode by the microcomputer is shown in FIG. 7. In a step 70 it is ascertained whether a preset number is depressed on the remote control unit by means of the preset keys 0 ... 9. If that is the case, the microcomputer addresses the corresponding memory location of the tuning memory 17. The microcomputer now reads (step 71) the tuning frequency F stored in this memory location and applies it to CITAC 8. As a result, the tuning voltage ($V_T$ in FIG. 4) corresponding to the relevant frequency is applied to the tuner. The microcomputer also reads (step 72) the system code S from which it determines the television standard at which the program is being received. In dependence thereon, it applies respective signals to the CITAC in order that it applies the type of modulation signal (M in FIG. 4), sound carrier frequency and other standard-dependent signals (CTRL in FIG. 4) to sound demodulator 11b and colour decoding circuit 11a. Finally, the microcomputer reads (step 73) the corresponding transmitter name NAM and applies it to the CCT decoder 142 for On-Screen-Display for several seconds. Since the transmitter names are determined by the manager of the transmitter station in accordance with local practice, the cumbersome manual programming of transmitter names is dispensed with. However, manual reprogramming of transmitter names in accordance with personal views remains possible.

In a step 74 of the TV operating mode program it is checked whether the user has depressed the OSD key (191 in FIG. 4). In that case a step 75 is performed in which an On-Screen-Display survey of all preset numbers and the associated station names is presented on the display screen.

In a step 76 of the TV operating mode program it is checked whether the user has depressed the PDC key (192 in FIG. 4). In a step 77 the microcomputer then reads the teletext page number PDC which is stored in the memory location under the current preset number and applies it to the teletext decoder 14. If the receiver is adapted for automatic display or recording preprogrammed television programs by means of PDC (Program Delivery Control) whose programming data are incorporated in this teletext page, this PDC page can be directly accessed without the user having to know the page number.

In a step 78 of the TV operating mode program it is checked whether the user has depressed the installation key (181 in FIG. 4). In that case the microcomputer executes the previously described installation program INST again (see FIG. 5). In practice, it will be desirable to re-execute the installation program after a new television program has been introduced by the transmitter station. Particularly if this new program is a new national program having a low preset number (in accordance with local wishes), the facility which is provided to download the program data again is much more attractive than, for example the manual shift of higher preset numbers and station names which have already been programmed.

Finally it is to be noted that nowadays many television receivers are provided with an extensive operating system menu in various languages. The user does not need to choose the language himself in the receiver described hereinbefore. Since the transmitter station transmits the language code of the locally used language (L in FIG. 2B), the receiver can automatically be adjusted to this language.

I claim:

1. A transmitter for transmitting in a given geographic area a plurality of television programs via respective transmission channels, comprising means for supplying a plurality of television programs each according to one of a plurality of different television standards, a data generator adapted to generate tuning data in the television signal of one of the television programs, said tuning data being representative of the transmission channels used by the transmitter station, the data generator further comprising means for transmitting for each transmitted television program a code indicating the television standard at which said television program is transmitted, and means for combining for transmission the television programs together with the tuning data and the code indicating the television standard at which each television program is transmitted for use by a receiver in the geographic area for tuning to a selected channel and for demodulating the received signal according to the relevant standard.

2. A receiver of television programs, comprising:

(a) a tuner for tuning to television programs, (b) a decoder for receiving and storing tuning data which are transmitted in the television signal of one of the television programs, which tuning data are representative of the receivable television programs, (c) a tuning memory for storing the tuning data in respective memory locations, (d) a control circuit coupled to said tuner, decoder and tuning memory and adapted to receive said tuning data and store them in the tuning memory, (e) said control circuit being adapted to receive and store a transmitted code indicating for each receivable television program the standard at which said television program is transmitted, and to demodulate and display said television program in conformity with the respective television standard when the receiver is tuned to said television program.

* * * * *